No. 820,810. PATENTED MAY 15, 1906.
S. T. MUFFLY.
PROCESS OF EXTRACTING PRECIOUS METALS FROM THEIR ORES.
APPLICATION FILED AUG. 14, 1905.
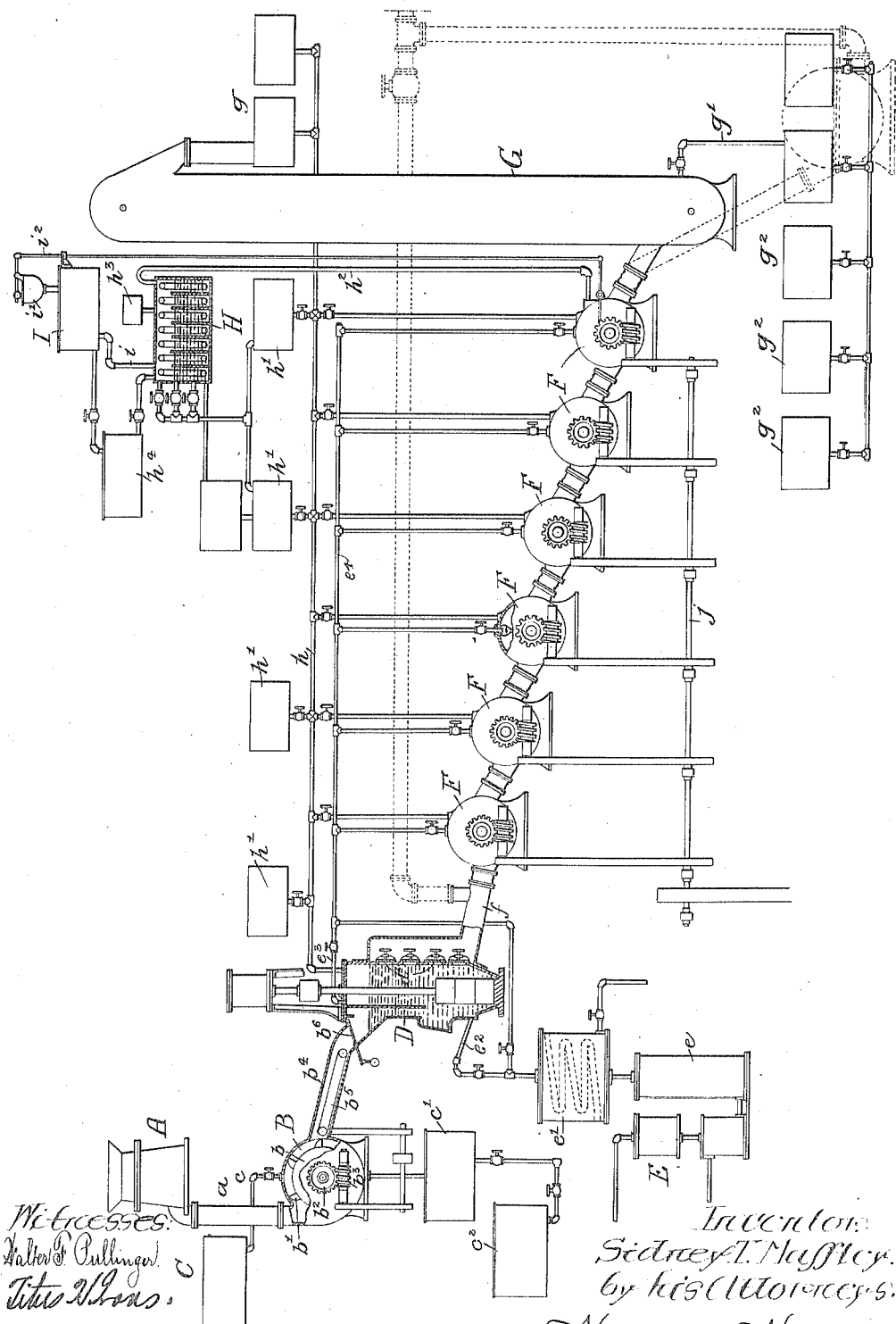
Witnesses:
Walter F. Pullinger
Titus I____
Inventor:
Sidney T. Muffly.
by his Attorneys
Howson & Howson

UNITED STATES PATENT OFFICE.

SIDNEY T. MUFFLY, OF PHILADELPHIA, PENNSYLVANIA, ASSIGNOR TO PHILADELPHIA CYANIDE PROCESS COMPANY, OF WILMINGTON, DELAWARE, AND PHILADELPHIA, PENNSYLVANIA, A CORPORATION OF DELAWARE.

PROCESS OF EXTRACTING PRECIOUS METALS FROM THEIR ORES.

No. 820,810.  Specification of Letters Patent.  Patented May 15, 1906.

Application filed August 14, 1905. Serial No. 274,119.

*To all whom it may concern:*

Be it known that I, SIDNEY T. MUFFLY, a citizen of the United States, residing in Philadelphia, Pennsylvania, have invented certain Improvements in a Process for Extracting Precious Metals from their Ores, of which the following is a specification.

One object of my invention is to provide a process in which not only is the time required for the treatment of a given body of ore greatly reduced over what has hitherto been necessary in cyanid processes, but the amount of cyanid solvent employed is also much less than hitherto.

It is further desired that the process of treating ore shall be so carried out that it shall be possible to save and repeatedly use the cyanid solvent, whose active element, cyanogen, to a great extent is evolved in the leaching of ores as hydrocyanic-acid gas and ordinarily lost at the present time.

I further desire to provide a process in which the labor in connection with the treatment of ores shall be reduced to a minimum, the whole process being of such efficiency that it shall be commercially possible to treat with profit low-grade ores running, for example, about one to two dollars per ton of ore.

Another object of the invention is to provide a process in which successive bodies of ore may be continuously treated and in which the cyanogen evolved as hydrocyanic-acid gas is cyclicly restored to the cyanid solvent and reused.

These objects I attain as hereinafter set forth, reference being had to the accompanying drawing, in which the figure is a representation, to some extent diagrammatic, of one combination of apparatus for accomplishing my invention.

In carrying out my invention I neutralize the acids or acid salts found in the ore by means of a solution of an alkaline hydrate applied to the crushed ore in a neutralizer. Immediately thereafter I deliver this washed and neutralized ore to the interior of a hermetically-sealed stamp-mortar containing an alkaline cyanid solution exposed to the direct downward pressure of compressed air. This inclosed stamp-mortar forms one end of what may be described as a "closed" conduit within which the ore is treated, said conduit consisting, beyond said stamp-mortar, of a number of lixiviators connected in series, in which the pulp is successively subjected to fresh bodies of cyanid solution until it is finally delivered as tailings to a device whereby it is removed. The conduit formed by the lixiviators and their connections and the stamp-mortar is at all times supplied with air under pressure greater than that of the atmosphere, so that the liquid in this conduit always has direct downward pressure of air upon its surface. The hydrocyanic-acid gas evolved in the process of lixiviating is conducted to a suitable condensing or absorbing chamber, where it is dissolved in a cyanid solution subsequently used in the treatment of further bodies of ore.

In the above drawing I have illustrated one combination of apparatus for carrying out the process, and in this drawing A represents an ore-crusher so constructed and adjusted that the ore delivered from it will be in pieces not exceeding a quarter to half a cubic inch in volume. Connected to this crusher by a chute $a$ is a neutralizer B, connected by means of a pipe $c$ with a tank C, there being also connected with said neutralizer, preferably to the lower part thereof, a filter-tank $c'$, in turn connected with a storage-tank $c^2$.

The neutralizer B preferably consists of an inclosed casing having within it a revoluble drum $b$, upon which are blades or buckets $b'$, there being any desired driving means for turning the drum, in the present instance a worm-wheel $b^2$, fixed to the drum-shaft, and a worm $b^3$, meshing with said wheel, to which power is supplied.

The neutralizing solution flows from apparatus B to sump-tanks and after precipitating soluble metallic salts is pumped back to supply-tanks for reuse.

A stamp-mortar D, inclosed in an air-tight casing, is connected to the neutralizer B by means of a closed conduit $b^4$, in which is a conveyer $b^5$, driven in any desired manner, for the purpose of conveying crushed ore from the neutralizer B to said stamp. This conduit is provided with an automatic valve $b^6$, counterweighted so as to normally remain closed to cut off communication between the interior of the stamp-mortar and the neutralizer B, the valve, however, being capable of automatically opening when a body of ore is placed upon it.

An air-compressor E, provided with a reservoir $e$ and a heating-chamber $e'$, is connected so as to supply air to the interior of the stamp-mortar either through a pipe $e^2$, which is placed to deliver air adjacent to the dies and stamps for the purpose hereinafter mentioned, or through a pipe $e^3$, which delivers the air into the upper part of the stamp-mortar casing, or through both of said pipes. A coil of pipe $e^8$ is usually placed in the chamber $e'$, and this is preferably connected to the exhaust of the stamp-operating engines, so as to supply heat to the compressed air.

Pulp and liquid from the stamp-mortar is conducted through a conduit $f$ to the first of a series of lixiviators F, connected in series and so arranged that the last of them delivers the sand or tailings to an inclosed bucket conveyer G, delivering into tanks, such as are shown at $g$. Liquid from the lixiviators F may be drawn from the bottom of the inclosed conveyer-casing G through a pipe $g'$ into any of a series of filter-tanks $g^2$. Connection is made between the air-compressor and each of the lixiviators F through branch pipes connected to a pipe $e^4$, in addition to which each of said lixiviators, as well as the stamp-mortar, has connected to it branches from a pipe $h$ in connection with any or all of a number of tanks $h'$. The last of the lixiviators F is connected by a pipe $h^2$ to a condensing or vapor-absorbing chamber H, in which are placed a number of preferably porous partitions or baffles designed to be kept moistened by a solution delivered from a suitable tank $h^4$. Liquid from this condensing-chamber may pass through suitable pipes to the tanks $h'$, while the tank $h^3$ is arranged to deliver into it.

The box I is connected by a pipe $i$ with the chamber H and has some form of valve $i'$, designed to be automatically and periodically opened by a rod $i^2$, actuated by ratchet mechanism driven from the driving means of the lixiviators F. In the present instance these lixiviators are of the same construction as the neutralizer B, and they are all driven by a common shaft $j$ through belts which drive worm-gearing operative upon the main shaft of the bucket or paddle carrying drum within the lixiviator-casing.

Under operating conditions ore is delivered from the crusher A in a comminuted state to the neutralizer B, where it is intimately mixed with a neutralizing solution delivered from the tank C, which solution preferably consists of an alkaline hydrate, such as sodium or potassium hydrate. This solution is designed to neutralize any acid salts which may be present in the ore due to the oxidation of sulfids or as a result of the action of water on decaying vegetable matter. The revolution of the drum $b$ of the neutralizer B deposits the neutralized and washed ore upon the conveyer $b^5$, which delivers it to the counterweighted valve $b^6$, and this automatically operates to discharge said ore into the stamp-mortar D. The interior of the stamp-mortar is filled with a weak cyanid solution, which may vary from .1 or less to .5 of one per cent., as the nature of an ore may require, this being delivered from the tanks $h'$. Air is also delivered from the compressor E through pipe $e^3$ to the interior of the stamp-mortar, and such air is preferably kept at a temperature of 60° or higher and is at a pressure of ten pounds or greater to the square inch.

If the ore under treatment is of a slaty or argillaceous nature, it may be also advisable to deliver air under pressure through the pipe $e^2$ in order to prevent the pulp or ore clogging the stamp. Screens of any desired mesh are provided at $d^2$, so that the pulp delivered from the stamp is under a certain fineness, and this pulp, with a portion of the weak cyanid solution, flows to the various lixiviators F, where the pulp is brought into intimate contact with a succession of fresh bodies of cyanid solution, which are at all times exposed to an air-pressure greater than that of the atmosphere acting directly downwardly upon their surfaces and which is delivered through pipes $e^4$.

I have found that the direct downward pressure of air greater than that of the atmosphere and exerted upon the surface of the cyanid solution very materially hastens the solvent action of the cyanid solution, and as a consequence by this means I am enabled to accomplish one of the important objects of my invention—namely, the shortening of the time necessary to treat a given body of ore. I have also found that by treating the ore within a closed container and under air-pressure acting directly downward upon the surface of the solution said solution is caused to extract a much larger percentage of metal from the ore, in some cases practically all of it, where hitherto it has been possible to extract by the cyanid process but a comparatively small amount of it, depending upon the complex or free nature of the ore.

It will be understood that the chemical reactions occurring in the treatment of a body of ore with a solution of a cyanid necessarily result in the freeing of relatively large amounts of hydrocyanic gas—as, for example, by reason of the ferrous sulfate and free sulfuric acid produced by the atmospheric oxidation of iron pyrites reacting upon the solution of potassium cyanid, thus:

$$2KCN + H_2SO_4 = 2HCN + K_2SO_4,$$

or by the action of carbon dioxid absorbed from the atmosphere, thus:

$$2KCN + CO_2 + H_2O = K_2CO_3 + 2HCN.$$

In addition to the above reactions, which obviously result in the liberation of hydrocyanic-acid gas, there is also a considerable loss of cyanogen, due to evaporation, as well as from other causes which have not been satisfactorily determined. Instead of allowing this gas to escape and go to waste, as has hitherto been the custom, I cause it, with air under pressure, to pass out of the last of the lixiviators F through the pipe $h^2$ and deliver it to a condensing-chamber H. In this latter I provide a series of partitions and baffles of burlap or other fabric saturated with a solution, preferably containing a double cyanid, such as cyanid of potassium and bromin. This solution absorbs the hydrocyanic-acid gas by reason of the fact that said gas is not only soluble in water, but also for the reason that the presence of the bromin compound materially assists and accelerates such solution, and I cause it to be delivered from time to time or continuously to the tanks $h'$, from whence it is permitted to flow to the stamp-mortar and the various lixiviators, where it is used again to treat ores.

The particular process of absorbing the hydrocyanic-acid gas referred to above forms the subject of a separate application for United States Patent, Serial No. 281,674, filed by me October 6, 1905.

In order to stop the passage of any compounds or vapors of base metallic salts which are frequently found to be carried with the hydrocyanic-acid gas and the compressed air, I deliver into the condensing-chamber a solution of ammonic hydrate from the vessel $h^3$, thereby forming hydrates with base metallic compounds so entering, which remain in the chamber H.

The compressed air is periodically allowed to escape from the chamber H through the box I, the valve $i'$ on this box being intermittently opened by action of the ratchet mechanism upon the rod $i^2$.

From the last lixiviator F the ore pulp or tailings, from which the gold and silver has been dissolved, pass into inclosed conveyer G and are carried by buckets to covered tank $g$, containing wash-water, to recover a small amount of the metals remaining in the cyanid moisture. After removing the wash-water for further use the tailings are then discharged from the tanks $g$ to a waste-dump or if containing valuable by-products to some other desired place by means of a sand-pump.

The cyanid solution containing the precious metals is drained from the conveyer G through the pipe $g'$ into tanks $g^2$, where it is filtered and from which it flows to storage-tanks for treatment in a series of electrolytic or other apparatus (not shown) for precipitation of the gold and silver, the solution thereafter being raised by a pump (not shown) to tanks and strengthened with fresh cyanid-solvent compound for further use in treating ores.

It will be understood by those skilled in the art that by regenerating and reusing the cyanogen evolved as hydrocyanic-acid gas during the carrying out of my improved process I am enabled to greatly reduce the cost of operation of the same, since the cyanid solvent constitutes one of the costly items in the operation thereof. Further, by the use of compressed air during the stamping and chemical action of the solvent on the ore-pulp not only is the time of treatment of the ore greatly lessened, but a very much greater proportion of the precious metals contained therein is caused to be dissolved by the cyanid than has hitherto been considered possible.

I claim as my invention—

1. The process of treating ores which consists in pulverizing said ores while they are immersed in a solution capable of dissolving the contained gold and silver, said solution being exposed to air under pressure greater than that of the atmosphere, substantially as described.

2. The process of treating ores which consists in subjecting them to the action of a cyanid solution exposed to constantly-renewed bodies of air under pressure greater than that of the atmosphere, collecting the hydrocyanic-acid gas evolved, passing the gas with air to a solvent liquid, dissolving said gas in the liquid and afterward permitting said air to escape, substantially as described.

3. The process of treating ores which consists in continuously conveying them through successive bodies of a cyanid solution exposed to the action of compressed air, passing the hydrocyanic-acid gas evolved and the air through liquid capable of dissolving said gas, and using said liquid to act on further bodies of ore, substantially as described.

4. The process of treating ores which consists in acting upon them by a solution of cyanid, dissolving the hydrocyanic-acid gas evolved in a solution of a double cyanid, and using said solution to act on further bodies of ore, substantially as described.

5. The process of treating ores which consists in acting upon them by a solution of cyanid, dissolving the hydrocyanic-acid gas evolved in a solution of a double cyanid and a hydrate compound, and using said solution to act on further bodies of ore, substantially as described.

6. The process of treating ores which consists in continuously conveying the pulverized ores through successive bodies of a cyanid solution under a direct downward air-pressure greater than that of the atmosphere, substantially as described.

7. The process of treating ores which consists in continuously conveying the pulverized ores through a cyanid solution exposed to direct downward pressure of constantly-renewed bodies of compressed air, absorbing the hydrocyanic-acid gas evolved in a body of liquid, and using said liquid to act upon further bodies of ore, substantially as described.

8. The process of treating ores which consists in first crushing the ores, then subjecting them to the action of an alkaline hydrate solution, then pulverizing said ores within a cyanid solution, then conveying the pulverized ores through further bodies of cyanid solution, substantially as described.

9. The process of treating ores which consists in pulverizing said ore within a cyanid solution, then conveying said ore through successive bodies of a solution under air having a direct downward pressure greater than that of the atmosphere, substantially as described.

10. The process of treating ore which consists in pulverizing said ore within a cyanid solution after neutralizing acid salts in the same, then conveying said ore through successive bodies of cyanid solution under a direct downward air-pressure greater than that of the atmosphere, said air being maintained at a temperature above the normal, substantially as described.

11. The process of treating ores and extracting gold and silver therefrom, which consists in rapidly and continuously passing them through an alkaline hydrate solution and immediately thereafter conveying them through an alkaline cyanid solution under a direct downward air-pressure greater than that of the atmosphere, substantially as described.

12. The process of treating ores which consists in subjecting them to an alkaline hydrate solution and immediately thereafter subjecting them to the combined action of an alkaline cyanid solution and air of an equable temperature having a direct downward pressure upon the solution greater than that of the atmosphere, substantially as described.

13. The process of treating ores continuously for the extraction of gold and silver, which consists in acting upon them with an alkaline neutralizing solution, then immediately thereafter conveying and subjecting them to a cyanid-solvent solution in the presence of heated air having a direct downward pressure upon the solution greater than that of the atmosphere; and passing the hydrocyanic-acid fumes to and absorbing same in a compound alkaline cyanid and alkaline hydrate solution; and at same time precipitating base-metal vapors arising with the hydrocyanic-acid fumes, substantially as described.

14. The process of treating ores to extract the gold and silver they contain, which consists in crushing the ore and neutralizing the acid salts in same, immediately conveying and pulverizing the said ores in an alkaline cyanid solution under air-pressure greater than that of the atmosphere; immediately and continuously conveying the ores through other bodies of cyanid solutions also under air-pressure greater than that of the atmosphere and forcing the hydrocyanic-acid fumes through and absorbing same in a compound alkaline cyanid and alkaline hydrate solution, using said solution in the treatment of further bodies of ore and simultaneously precipitating vapors of base elements arising with the hydrocyanic-acid fumes, substantially as described.

In testimony whereof I have signed my name to this specification in the presence of two subscribing witnesses.

SIDNEY T. MUFFLY.

Witnesses:
WILLIAM E. BRADLEY,
JOS. H. KLEIN.